United States Patent
Mori (10) Patent No.: US 9,948,812 B2
(45) Date of Patent: Apr. 17, 2018

(54) SCANNER AND NON-TRANSITORY COMPUTER-READABLE MEDIUM STORING PROGRAMS THEREFOR

(71) Applicant: BROTHER KOGYO KABUSHIKI KAISHA, Nagoya-shi, Aichi-ken (JP)

(72) Inventor: Kosuke Mori, Handa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/271,489

(22) Filed: Sep. 21, 2016

(65) Prior Publication Data
US 2017/0094093 A1    Mar. 30, 2017

(30) Foreign Application Priority Data
Sep. 28, 2015    (JP) ................... 2015-189233

(51) Int. Cl.
*H04N 1/04* (2006.01)
*H04N 1/00* (2006.01)

(52) U.S. Cl.
CPC ....... *H04N 1/0464* (2013.01); *H04N 1/00588* (2013.01); *H04N 1/00689* (2013.01); *H04N 1/00694* (2013.01); *H04N 1/00814* (2013.01); *H04N 2201/0081* (2013.01); *H04N 2201/0094* (2013.01)

(58) Field of Classification Search
CPC ............ H04N 1/0464; H04N 1/00588; H04N 1/00814; H04N 1/00689; H04N 1/00694
USPC ....................... 358/488, 474, 498
See application file for complete search history.

(56) References Cited

U.S. PATENT DOCUMENTS

| | | | |
|---|---|---|---|
| 9,225,869 B2* | 12/2015 | Miyamoto | H04N 1/121 |
| 9,672,455 B2* | 6/2017 | Nguyenvan | G06K 15/1868 |
| 2014/0226172 A1 | 8/2014 | Kadobayashi | |

FOREIGN PATENT DOCUMENTS

| | | |
|---|---|---|
| JP | 2004-109349 A | 4/2004 |
| JP | 2005-72919 A | 3/2005 |
| JP | 2014-171209 A | 9/2014 |

* cited by examiner

*Primary Examiner* — Houshang Safaipour
(74) *Attorney, Agent, or Firm* — Merchant & Gould P.C.

(57) ABSTRACT

When an image on an original document placed on the original document table is scanned, a scanning device is moved along the original document table, starting from a first position, while an image on the original document fed by the automatic document feeder is scanned, the scanning device located at a second position. When an original document sensor detects the original document at a particular position in the automatic document feeder, the scanning device is moved to the second position, while when the original document sensor does not detect the original document at the particular position after scanning of the original document placed on the original document table has completed and before the scanning device is returned to the first position, the scanning device is located at the first position, on condition that the controller executes the first scanning process and a continuous scanning mode is effected.

9 Claims, 8 Drawing Sheets

SCANNER AND NON-TRANSITORY COMPUTER-READABLE MEDIUM STORING PROGRAMS THEREFOR

This application claims priority under 35 U.S.C. § 119 from Japanese Patent Application No. 2015-189233 filed on Sep. 28, 2015. The entire subject matter of the application is incorporated herein by reference.

BACKGROUND

Technical Field

The present disclosures relate to a scanner and a non-transitory computer-readable medium containing instructions which cause a computer to control operations of the scanner. In particular, the present disclosures relate to a scanner which is capable of scanning images in accordance with any one of multiple scanning methods, and further, capable of executing "a continuous scanning" with switching among the multiple scanning methods. The continuous scanning (hereinafter, also referred to as a scanning in a continuous scanning mode) is a process of executing multiple scanning jobs respectively corresponding to multiple scanning instructions and accumulating scanned data without outputting the same until a user instruction to finish the continuous scanning. When the user inputs the instruction to finish the continuous scanning, multiple pieces of scanning data respectively generated in the multiple scanning jobs, which are executed in the continuous scanning mode, are output collectively as a single piece of scanned data.

Related Art

Conventionally, two types of scanning methods have been generally known. One is known as an FB (flatbed) method, in which an original document is placed on a document placement table, or a flatbed, and an optical device for scanning an image on the original document is moved along the document placement table. The other is known as an ADF (automatic-document feeder) method, in which the original document is fed by the ADF and an image on the original document which is being fed by the ADF is scanned by an optical device located at a particular position. Recently, a scanning device capable of using both of the FB method and ADF method has been widely used.

It is noted that, in the scanning device capable of using the FB method and the ADF method to scan the original documents, a position of the optical device is changed depending on the used method. One conventionally-known example of such a scanning device is configured such that the optical device is automatically located at a scanning position for the ADF method when the original documents are set to the ADF, even before a scanning instruction is input by a user.

SUMMARY

The conventionally-known scanning device mentioned above has a following problem. When scanning jobs in the continuous scanning mode are executed with switching among the scanning methods (e.g., the FB method and the ADF method), the optical device should be moved to from a position corresponding to the current method to a position corresponding to the method to be used after switching. Recently, a quick completion of scanning jobs is desired. In the conventional scanning device mentioned above, positioning of the optical device, in view of the quick completion, when multiple scanning jobs are executed in the continuous scanning mode has not been considered.

According to aspects of disclosures, there is provided a scanner, which has an original document table, an automatic document feeder configured to automatically feed original documents, an original document sensor configured to output different signals depending on whether the original document is located at a particular position in a conveying path of the automatic document feeder, a scanning device and a controller. The controller is configured to execute a first scanning process in which the controller causes the scanning device to move along the original document table, starting from a first position, and to scan an image on the original document placed on the original document table, a second scanning process in which the controller causes the automatic document feeder to feed the original documents one by one, locates the scanning device at a second position, and causes the scanning device to scan the image on the original document fed along the conveying path, and a first positioning process after the first scanning process in which the controller locates the scanning device to the second position when the original document sensor outputs a signal indicative of presence of the original document and to the first position when the original document sensor does not output the signal indicative of presence of the original document after scanning of the original document in the first scanning process has completed and before the scanning device is returned to the first position, on condition that the controller executes the first scanning process and a continuous scanning mode, in which multiple scanning jobs are continuously executed, is effected.

According to aspects of disclosures, there is also provided a non-transitory computer-readable medium storing instructions for a scanner having an original document table, an automatic document feeder configured to automatically feed original documents, an original document sensor configured to output different signals depending on whether the original document is located at a particular position in a conveying path of the automatic document feeder, a scanning device, and a controller. The instructions, when executed by the controller, cause the scanner to execute a first scanning process in which the controller causes the scanning device to move along the original document table, starting from a first position, and to scan an image of the original document placed on the original document table, a second scanning process in which the controller causes the automatic document feeder to feed the original documents one by one, locates the scanning device at a second position, and causes the scanning device to scan the image on the original document feed along the conveying path, and a first positioning process after the first scanning process in which the controller locates the scanning device to the second position when the original document sensor outputs a signal indicative of presence of the original document and to the first position when the original document sensor does not output the signal indicative of presence of the original document after scanning of the original document in the first scanning process has completed and before the scanning device is returned to the first position, on condition that the controller executes the first scanning process and a continuous scanning mode, in which multiple scanning jobs are continuously executed, is effected.

DETAILED DESCRIPTION OF EMBODIMENTS

Hereinafter, referring to the accompanying drawings, a scanner 100 according to an illustrative embodiment of the disclosures will be described.

Figure 1:
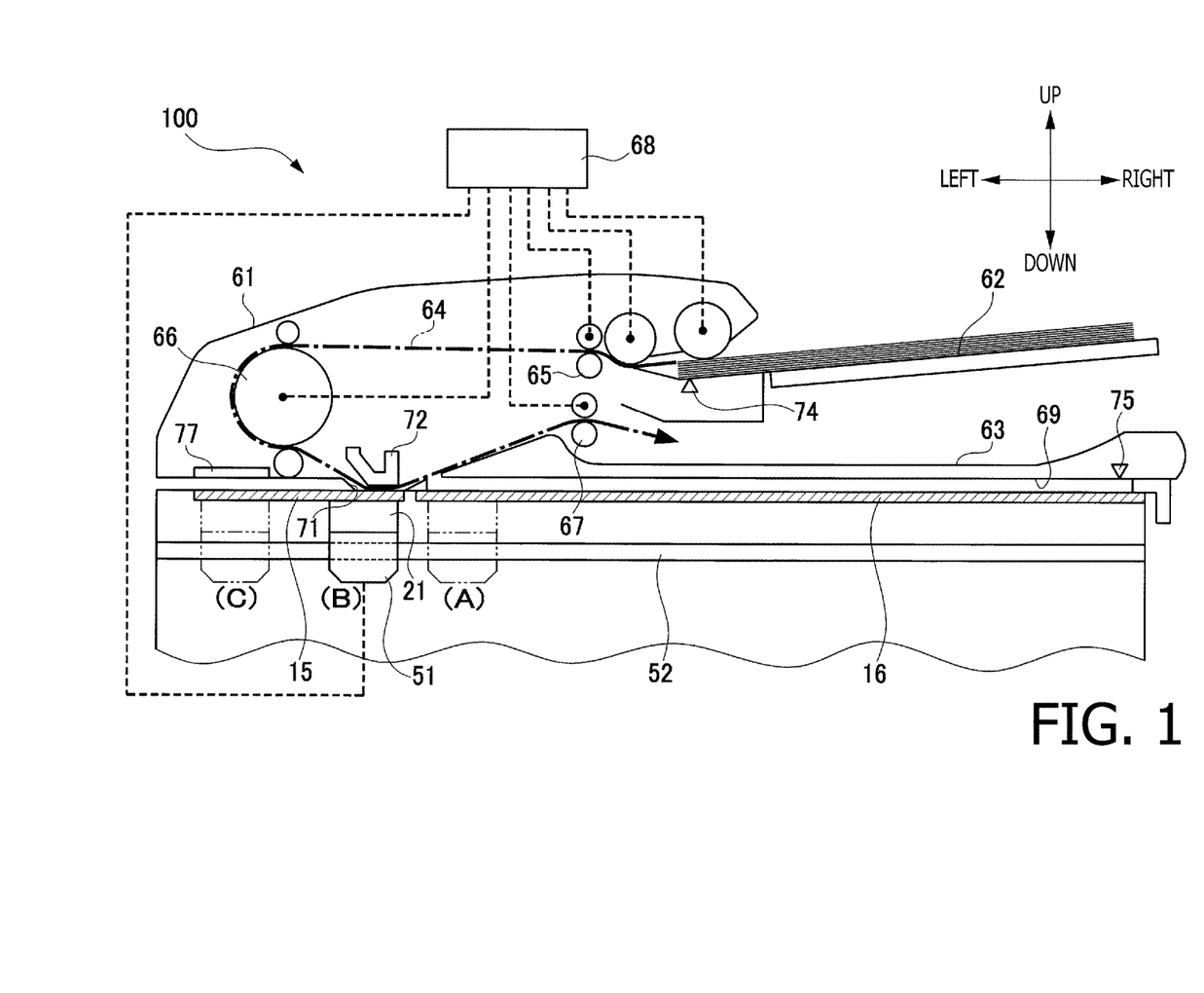
FIG. 1 is a cross-sectional view showing main components of a scanner according to an illustrative embodiment of the disclosures.

As shown in FIG. 1, the scanner has a scanning device 21, which is configured to optically read an image. The scanner 100 is configured to relatively move an original document with respect to the scanning device 21 so that the scanning device 21 scans a two-dimensional image formed on the original document. According to the illustrative embodiment, the scanning device 21 is configured such that multiple optical elements are aligned in a line extending in a main scanning direction, which is a direction perpendicular to a plane of FIG. 1. The optical elements convert reflected light from the original document to electrical signals representing the image on the original document, and output the electrical signals. Well-known examples of such a scanning device 21 are CIS (contact image sensor) and CCD (charge coupled device). In the following description, directions are defined as shown in FIG. 1 by arrows. As shown in FIG. 1, a left direction and a right direction of the scanner 100 are defined as a right-hand direction and a left-hand direction in FIG. 1, respectively, and an auxiliary scanning direction is the left-right direction in FIG. 1.

The scanner 100 according to the illustrative embodiment is configured to execute an FB (flatbed) scanning and an ADF (automatic document feeder) scanning. The FB scanning is an operation to scan an image formed on an original document which is placed on an original document table with moving the scanning device 21. The ADF scanning is an operation to scan an image on the original document with the scanning device 21 located at a fixed position with feeding the original document. For executing the FB scanning and the ADF scanning, the scanner 100 has a carriage 51 which moves the scanning device 21, and an ADF (automatic document feeder) 61 which is configured to feed the original documents one by one.

The scanner 100 has two pieces of transparent contact glass 15 and 16, which are arranged below the ADF 61 and above a movable range of the scanning device 21. The contact glass 15 and the contact glass 16 are arranged on a same plane, which extends in right-left direction and in front-rear direction (i.e., on the plane which is perpendicular to a plane of FIG. 1). The contact glass 15 is arranged on a left side in FIG. 1 with respect to the contact glass 16. The scanning device 21 is configured to scan an image on the original document which is fed by the ADF 61 and passes over the contact glass 15, or placed on the contact glass 16.

The scanning device 21 is mounted on the carriage 51, which is movable in the right-left direction (i.e., in the auxiliary scanning direction) in FIG. 1. The carriage 51 is slidably supported by a slide shaft 52 extending in the right-left direction in FIG. 1, and driven by a motor 68 (see FIG. 2) to move along the slide shaft 52. Both ends of the slide shaft 52 are fixed to a housing of the scanner 100. It is noted that the scanning device 21 can be moved in either right or left direction in FIG. 1 by suitably driving the motor 68.

The ADF 61 has an original document tray 62 on which original documents to be scanned are placed, and a discharge tray 63 configured to catch the original documents having been scanned. The original document tray 62 is arranged above the discharge tray 63. Inside the ADF 61, a conveying path 64, in which the original document is conveyed, is defined to extend from the original document tray 62 to the discharge tray 63. In FIG. 1, the conveying path 64 is indicated by one-dotted line, with an arrowhead indicating a direction in which the original document is conveyed. As shown in FIG. 1, along the conveying path 64, a feed-in roller pair 65, a main roller 66, a discharge roller pair 67 are arranged in this order from an upstream side to a downstream side in the conveying direction.

The ADF 61 is configured such that an opening 71 is formed on a lower surface thereof, and an original document holding plate 72 is exposed through the opening 71 when there is no original document at the opening 71. The original holding plate 72 is arranged on a downstream side with respect to the main roller 66, and on an upstream side with respect to the discharge roller pair 67.

On the lower surface of the ADF 61, a flatbed cover 69 is integrally formed. One side of the flatbed cover 69 is rotatably connected to the housing of the scanner 100 so that the flatbed cover 69 can be rotated upward (i.e., opened) with respect to the housing of the scanner 100, together with the ADF 61. When closed, the flatbed cover 69 covers upper surfaces of the contact glass 15 and the contact glass 16, while the upper surfaces of the contact glass 15 and the contact glass 16 are exposed when the flatbed cover 69 is opened. Thus, depending on a location of the flatbed cover 69, the upper surfaces of the contact glass 15 and the contact glass 16 are exposed to outside or covered with the flatbed cover 69. When flatbed cover 69 is closed, the original holding plate 72 of the ADF 61 faces the contact glass 15 with the conveying path 64 sandwiched therebetween (see FIG. 1). It is noted that the flatbed cover 69 is an example of a cover part set forth in claims.

Figure 7:
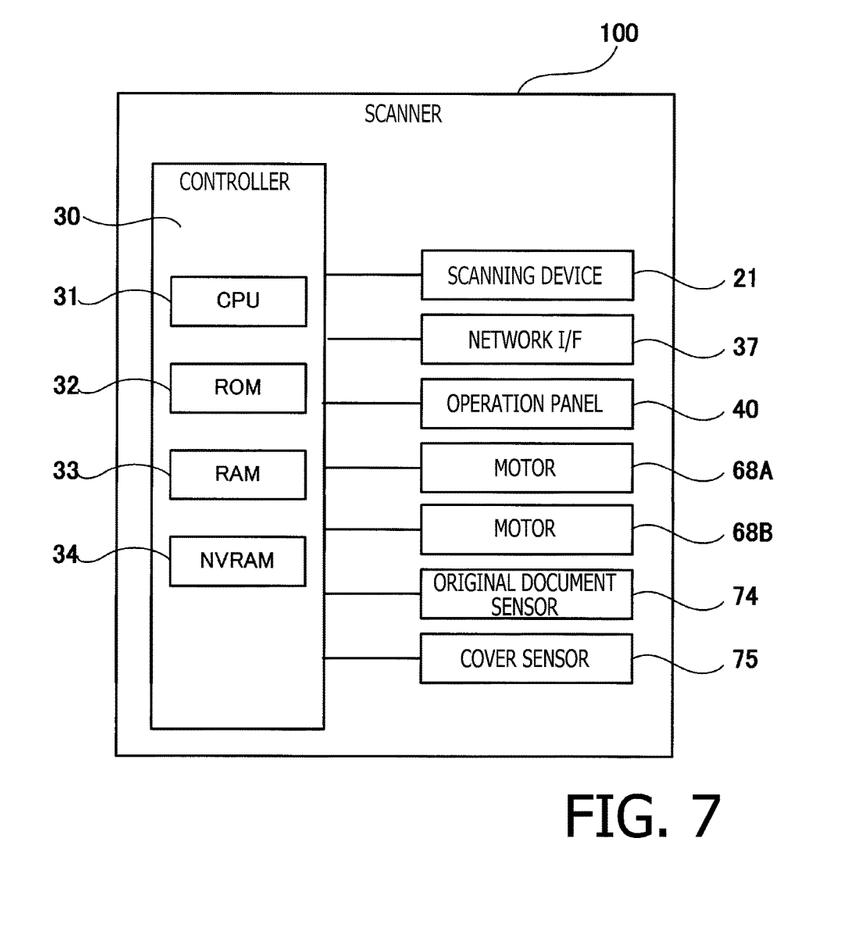
FIG. 7 is a block diagram showing an electrical configuration of the scanner according to a modification of the illustrative embodiment shown in FIG. 2.

The scanner 100 has the motor 68 which drives the carriage 51 and multiple conveying members, including the main roller 66, of the ADF 61. The motor 68 is an example of a common motor which is set forth in the claims. It is noted that, instead of using a single motor 68 (i.e., the common motor), two different motors 68A and 68B to respectively drive the carriage 51 and the ADF 61 may be used as shown in FIG. 7. It is noted that the motor 68A used to move the carriage and the motor 68B to move the ADF 61 are examples of a first motor and a second motor set forth in the claims, respectively.

When the FB scanning is executed, the original document is placed on the upper surface of the contact glass 16. The contact glass 16 is an example of an original table set forth in the claims. When the FB scanning is started, the scanner 100 positions the scanning device 21 at an FB start position (i.e., a position A in FIG. 1). The FB start position is a position below the contact glass 16, and in the vicinity of the left end of the contact glass 16. It is noted that the FB start position is an example of a first position set forth in the claims.

In the FB scanning, the scanner 100 causes the scanning device 21 to move, in an auxiliary scanning direction (i.e., rightward in FIG. 1), from the FB start position at a particular moving speed along the lower surface of the contact glass 16, and to scan the image of the original document placed on the contact glass 16. When the scanning within a designated scanning range has been completed, the scanner 100 tentatively stops the scanning operation of the scanning device 21. It is noted that, when the FB scanning is finished, the scanning device 21 is located at a scan end position, which is a position on the right side, in FIG. 1, with respect to the FB start position.

When the ADF scanning is executed, the scanner 100 causes the scanning device 21 to be positioned an ADF start position (i.e., a position B in FIG. 1) which is below the contact glass 15, and to execute the scanning operation. It is noted that the ADF start position is a position at which the scanning device 21 faces the opening 71 with the contact glass 15 sandwiched therebetween, and is on the left side with respect to the FB start position. It is noted that the ADF start position is an example of a second position set forth in the claims.

In the ADF scanning, the scanner 100 picks up the original documents accommodated in the original document tray 62 of the ADF 61 one by one with use of the feed-in roller 65, moves the picked-up original document along the conveying path 64 to make a U-turn downward. Further, the ADF 61 makes the original document pass between the original document holding plate 72 and the contact glass 15, and then discharges the original document on the discharge tray 63 with use of the discharge roller pair 67. As above, the original document conveyed in the ADF 61 faces the scanning device 21 through the contact glass 15 at the opening 71. It is noted that the scanning device 21 stays at the ADF start position when the ADF scanning is being executed and completed. It is also noted that the scanning device 21 need not be moved during the ADF scanning.

The scanner 100 is provided with an original document sensor 74 which is configured to detect presence/absence of the original document(s) on the original document tray 62, and a cover sensor 75 which is configured to detect an opened/closed status of the flatbed cover 69. The original sensor 74 is a light-reflection sensor arranged on the lower surface of the original document tray 62, and is configured to output different signals depending on whether one or more original documents are present or absent on the original document tray 62. The cover sensor 75 is also the light-reflection sensor arranged on the lower surface of the flatbed cover 69, and is configured to output different signals depending on whether the flatbed cover 69 is opened or closed with respect to the contact glasses 15 and 16.

Further, the scanner 100 has a white plate 77 which is arranged on the upper surface of the contact glass 15 at a position on the left side with respect to the opening 71 of the ADF 61 (see FIG. 1). The white plate 77 has a particular light reflectivity and is used as white level reference member. It is noted that the white plate 77 is an example of a white level reference plate set forth in the claims. It is noted that an optical characteristic of the optical elements of the scanning device 21 may change due to a change of temperature and the like. Therefore, the scanner 100 is configured to execute a light amount adjustment of the scanning device 21. In the light amount adjustment, the scanner 100 causes the scanning device 21 to be positioned at a position C in FIG. 1 (which will be referred to as a home position), at which the scanning device 21 faces the white plate 77, and to scan the white plate 77. Then, the scanner 100 executes white level adjustment based on the result of scanning. Since such a white level adjustment is a well-known technique, detailed descriptions thereof will not be provided.

It is noted that the scanner 100 causes the scanning device 21 to be positioned to the home position C and stopped thereat (see FIG. 1) when scanning is not being executed. The home position is a position different from either the FB start position or the ADF start position, and the scanning device 21 does not scan the original document when positioned at the home position C. It is noted that the home position C is an example of a third position set forth in the claims. As is shown in FIG. 1, the home position is on the left side with respect to the ADF start position.

Next, an electrical configuration of the scanner 100 will be described. The scanner 100 has a controller 30 which includes a CPU (central processing unit) 31, a ROM (read only memory) 32, a RAM (random access memory) 33, an NVRAM (non-volatile random access memory) 34 (see FIG. 2). The scanner 100 further has the scanning device 21, a network OF (interface) 37, an operation panel 40, a motor 68, the original document sensor 74 and the cover sensor 75, which are electrically connected to the controller 30.

The ROM 32 stores control programs, setting items/values and initial values to control the operation of the scanner 100. The RAM 33 is used as a work area in which the control programs are retrieved and/or data is temporarily stored. The CPU 31 executes the control programs retrieved from the ROM 32 to control respective components of the scanner 100 with storing processing results in the RAM 33 and/or the NVRAM 34. It is noted that the CPU 31 is an example of a controller set forth in the claims. It is noted that the controller 30, instead of the CPU 31, may be regarded as the "controller" set forth in the claims.

Figure 2:
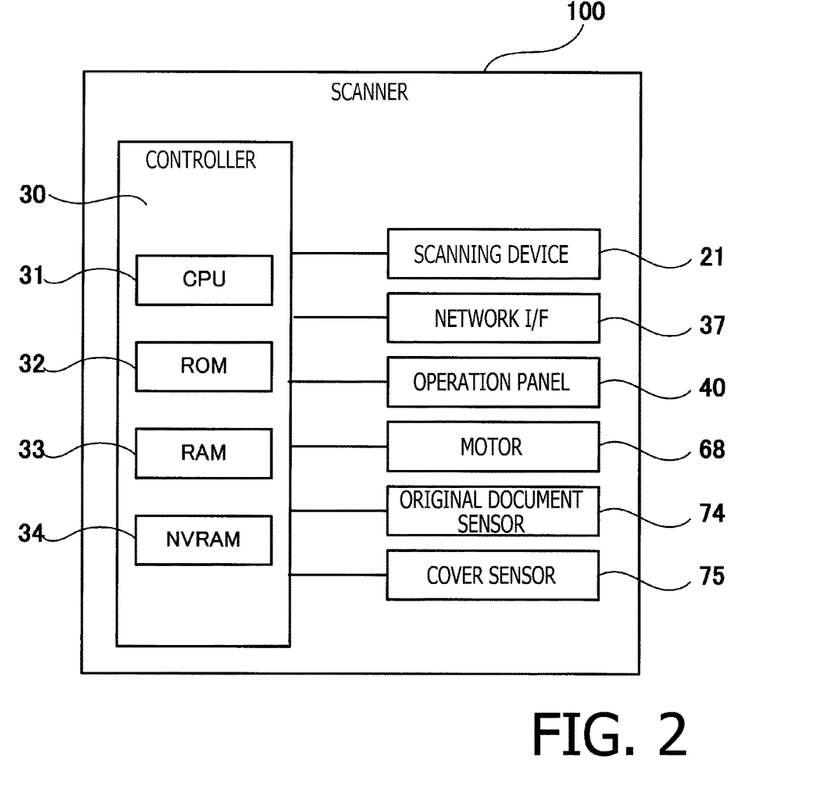
FIG. 2 is a block diagram showing an electrical configuration of the scanner according to the illustrative embodiment of the disclosures.

The network interface 37 is hardware used to communicate with an external apparatus, which is connected with the scanner 100 through a network such as a wired LAN (local area network) and/or wireless LAN. The operation panel 40 is hardware used to display and to receive user input. It is noted that the controller 30 in FIG. 2 is a collective name of hardware used to control the scanner 100 (e.g., CPU 31 and the like), and the "controller" 30 does not necessarily address a single piece of hardware.

Next, referring to FIG. 3, a scanning operation in the continuous scanning mode by the scanner 100 according to the illustrative embodiment will be described. The scanner 100 is configured to receive a setting of the scanning in the continuous scanning mode. The scanning in the continuous scanning mode is to execute multiple scanning jobs without outputting image data at completion of respective print jobs, but to collectively output a plurality of pieces of image data, which are generated by respective scanning jobs, as single piece of image data.

For example, when the scanning in the continuous scanning mode is executed, the scanner 100 executes a scanning job in accordance with a scanning instruction, and stores imaged data generated in the scanning job in the RAM 33 when the scanning job is completed. Thereafter, when the scanner 100 receives a next scanning instruction, the scanner 100 executes another scanning job in accordance with the next scanning instruction and stores image data generated in another scanning job in the RAM 33. The scanner 100 repeats such an operation as far as scanning instructions are received in the continuous scanning mode. When an end instruction of the continuous scanning mode is received, the scanner 100 outputs the plurality of pieces of image data which have been stored in the RAM 33 during the continuous scanning mode. Thus, the scanner 100 keeps storing image data generated by scanning in the RAM 33 unless the end instruction of the continuous scanning mode is received.

Figure 3:
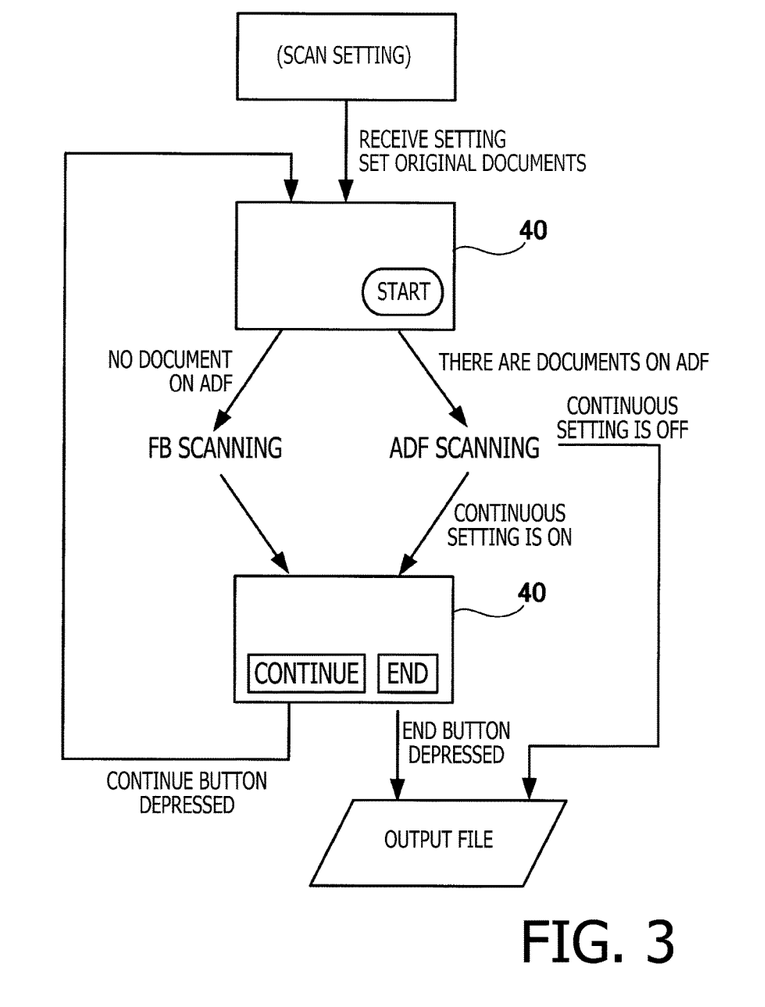
FIG. 3 illustrates a continuous scanning of the scanner according to the illustrative embodiment of the disclosures.

As shown in FIG. 3, the scanner 100 receives scan settings which include, for example, a setting of a size of the original documents subject to scanning, a setting of a selection of a color scanning or monochromatic scanning, a setting of a format of output files, and a setting of execution/nonexecution of the continuous scanning. The settings are stored in one of the RAM 33 and the NVRAM 34.

When the scanner 100 receives an instruction to start scanning, the scanner 100 executes the ADF scanning when there are original documents on the ADF 61. When there is no original document on the ADF 61, the scanner 100 executes the FB scanning. When the FB scanning is executed, the scanner 100 scans an image of original document placed on the contact glass 16, and stores the image data representing the scanned image in the RAM 33. Since the continuous scanning is being executed, the scanner 100 does not output the generated image data immediately, and displays an inquiry screen on the display of the operation panel 40. According to the illustrative embodiment, the scanner 100 displays an inquiry asking the user to scan a next original document, and then, displays a screen including a "Continue" button and an "End" button on the display of the operation panel 40 as indicated in FIG. 3.

In the above state, when a selection of the "Continue" button is received, the scanner waits for an instruction to start scanning, and executes the scanning operation upon receipt of the instruction to start scanning. As above, according to the illustrative embodiment, the scanner 100 operates such that the setting of execution of continuous scanning is being effected when the "Continuous" button is selected during execution of the FB scanning, even if the continuous scanning is not effected in the scan settings.

When a selection of the "End" button is received, the scanner 100 generates a file which is designated in the scan settings based on the image data stored in the RAM 33, and outputs the thus generated file. For example, when the designated format of the output file is a PDF (portable document format), the scanner generates a single PDF file based on the image data stored in the RAM 33, and outputs the PDF file. It is noted that, when the continuous scanning is executed, multiple pieces of image data stored in the RAM 33 are collected to generate one file.

When the ADF scanning is executed, the scanner 100 scans the original documents placed onto the ADF 61 one by one, and stores the image data representing respective images on the original documents in the RAM 33. When the ADF scanning is started with the continuous scanning mode being effected in the scan settings, as in the FB scanning, the inquiry asking the user to continue scanning, and then, displays a screen including the "Continue" button and the "End" button on the display of the operation panel 40. When the ADF scanning is started in a non-continuous scanning mode, the scanner 100 starts outputting the image data of the scanned image immediately upon completion of scanning of the original documents placed on the ADF 61.

During the continuous scanning, the scanning methods of continuously executed scanning jobs may be of the same methods or different methods. That is, the scanner 100 can execute the continuous scanning of the ADF scanning and the ADF scanning, the ADF scanning and the FB scanning, the FB scanning and the ADF scanning, and the FB scanning and the FB scanning. For example, when the user wishes to have a book consisting of covers made of thick paper and contents pages made of thin paper scanned, by causing the scanner 100 to scan a front cover by the FB scanning, the contents pages by the ADF scanning and a back cover by the FB scanning in the continuous scanning mode, thereby a single PDF file of the book being obtained. In such a case, the continuous scanning of the FB scanning, the ADF scanning and the FB scanning in this order can be executed. It is noted that, when the FB scanning is executed after the ADF scanning, the scanner 100 waits for selection of the "Continue" button after the original documents on the ADF 61 have been scanned.

Further, according to the illustrative embodiment, when the FB scanning or the ADF scanning has been executed and the continuous scanning is currently selected, the scanner 100 moves the scanning device 21 to the position A or B, which corresponds to the scanning method likely to be used for the next scanning job in accordance with a particular rule, before receiving the next scan start instruction. It is noted that either one of the start of scanning and the setting of the continuous scanning may be executed before the other one. That is, the scanner 100 may receive the setting of the continuous scanning before receiving the scan instruction to scan the first document of the original documents. Alternatively, the scanner 100 may receive the scan instruction to scan the first document of the original documents firstly, and receive the setting of the continuous scanning before a particular time period has passed after scanning has been started.

It is noted that life of the motor 68 may be shortened if it is being used in a high-temperature state in which the temperature of the motor 68 exceeds a particular reference temperature. A process of restricting operation of the motor 68 is an example of a restriction process set forth in the claims. According to the illustrative embodiment, the reference temperature referred to when driving of the motor 68 is restricted is stored in the ROM 32 or the NVRAM 34.

As mentioned above, in the continuous scanning mode, the scanner 100 determines a location of the scanning device 21 with assuming the scanning method for the next scanning job after one scanning job has executed. When the next scanning method is assumed, there is a case in which the motor 68 is driven to move in order to detect presence/absence of the original document on the contact glass 16. There is a tendency that the temperature of the motor 68 rises when the motor 68 is continuously driven. Therefore, when the temperature of the motor 68 is close to the reference temperature, and the motor 68 is driven to assume the next scanning method, the temperature may reach the reference temperature when the motor is being driven to detect the presence/absence of the original document. That is, improvement of the productivity is expected if the scanning device 21 is moved, in advance, to the scan start position with assuming the next scanning method. However, if the temperature of the motor 68 rises due to movement of the motor 68 and reaches the reference temperature, the scanning operation should not be executed, which may lower the productivity. To avoid such a problem, improvement described below is implemented.

Figure 4:
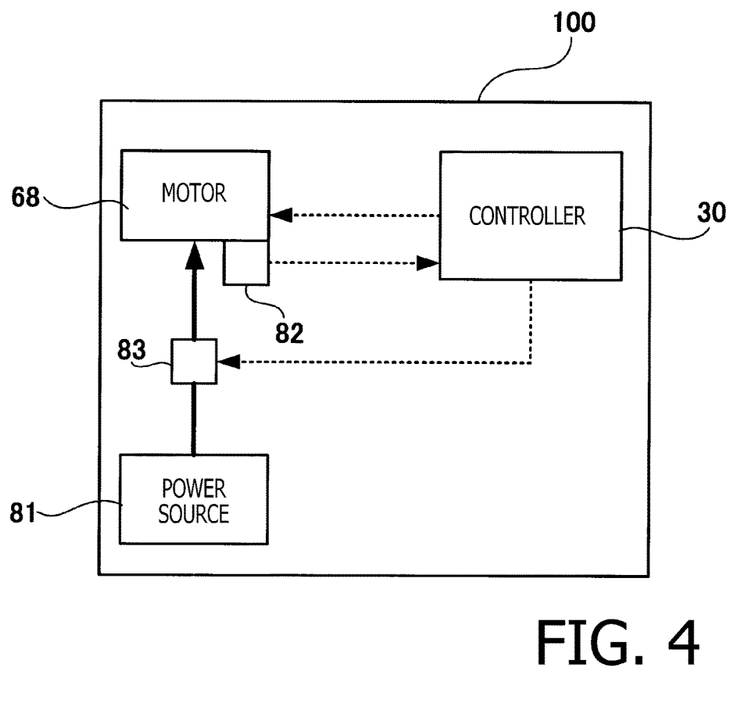
FIG. 4 illustrates a configuration of controlling a motor according to the illustrative embodiment of the disclosures.

According to the illustrative embodiment, the controller 30 controls the movement of the motor 68. As shown in FIG. 4, the scanner 100 has a power source 81 configured to supply electrical power to the motor 68, a temperature detector 82 configured to detect the temperature of the motor 68 and a cut-off device 83 configured to cut off the electrical power supplied from the power source 81 to the motor 68.

The temperature detector 82 outputs a signal corresponding to the temperature of the motor 68. The controller 30 obtains the temperature of the motor 68 based on the output signal of the temperature detector 82. It is noted that the temperature detector 82 may be a temperature sensor which directly measures the temperature of the motor 68 and output a signal representing the measured temperature. Alternatively, the temperature detector 82 may be a counter which counts an encoded signal to obtain a moving amount of the motor 68 during continuous movement thereof, and outputs a signal based on the count value. In this case, the controller 30 may assume the temperature of the motor 68 based on the moving amount of the motor 68 (i.e., the counted encoded signal) during the continuous movement thereof. As above, according to the aspect of the disclosures, the temperature of the motor 68 the controller 30 obtains may be either a directly measured value or an indirectly obtained (e.g., assumed) value.

Figure 8:
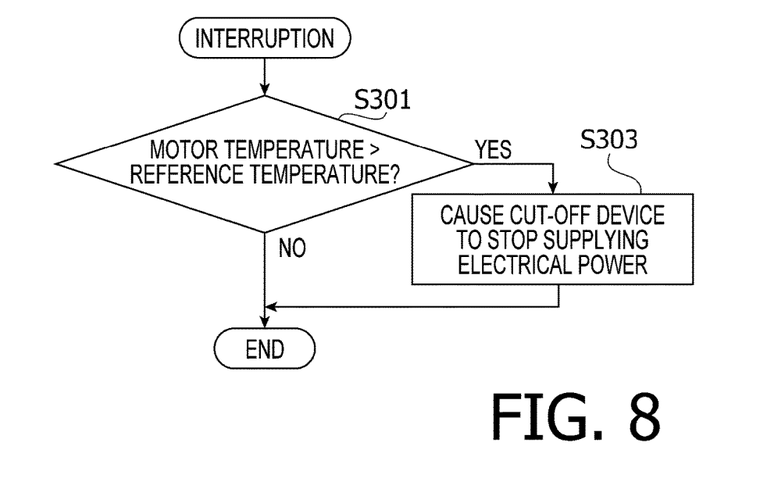
FIG. 8 is an interruption process of monitoring the temperature of the motor according to the illustrative embodiment.

The cut-off device 83 is controlled by the controller 30 to switch a power supplying status with respect to the motor 68. As shown in FIG. 8, when the controller 30 determines that the temperature of the motor 68 is higher than the reference temperature (S301), the controller 30 causes the cut-off device 83 to cease supplying the electrical power to the motor 68 (S303). This process shown in FIG. 8 may be repeatedly executed at every particular time interval as an interruption process. It is noted that, instead of ceasing the power supply to the motor 68, the controller 30 may simply not drive the motor 68 or may drive the motor 68 such that the moving speed of the motor 68 is lowered.

When there are two motors 68A and 68B as shown in FIG. 7, temperatures of the motors 68A and 68B are obtained, respectively. Then, each of the temperatures of the motors 68A and 68B may be compared with the reference temperature (S301). When it is determined that the temperature of at least one of the motors 68A and 68B exceeds the reference temperature (S301: YES), driving of the at least one of the motors 68A and 68B of which temperature is determined to exceed the reference temperature may be restricted (S303).

Figure 5:
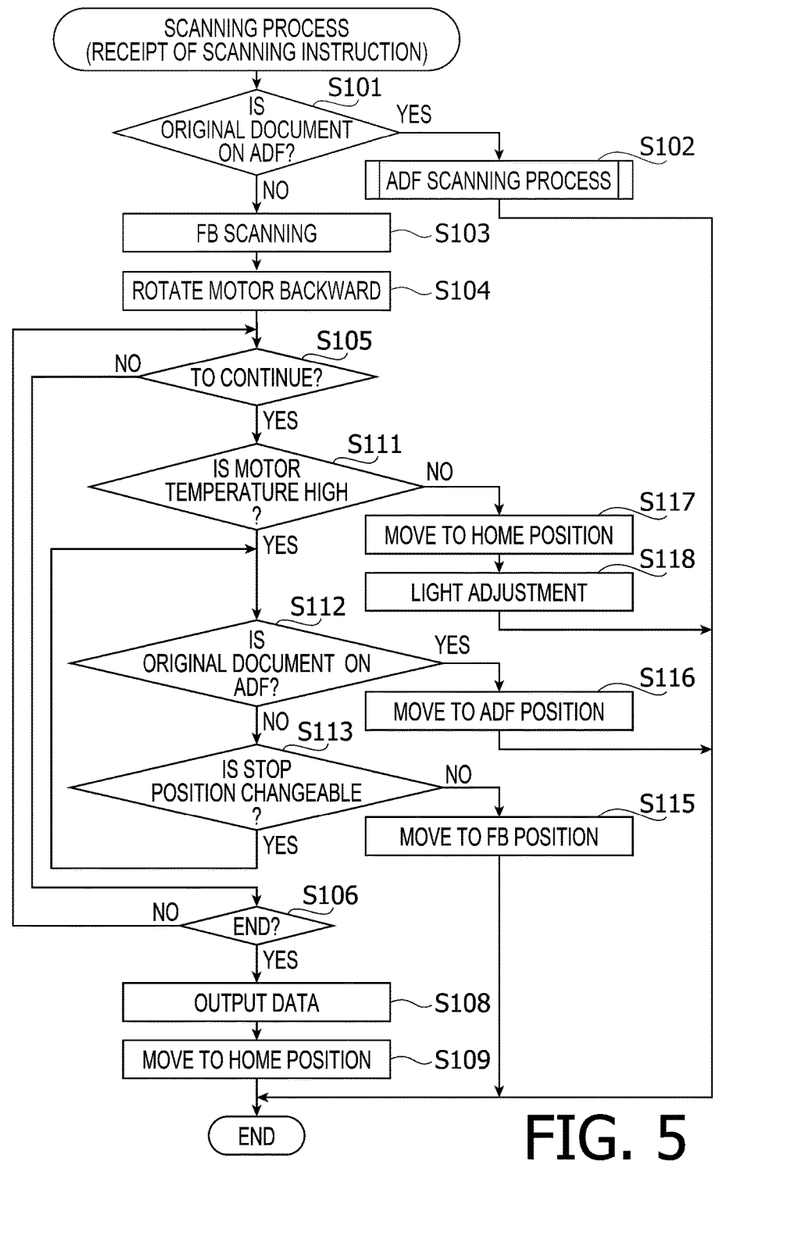
FIG. 5 is a flowchart illustrating a scanning process according to the illustrative embodiment of the disclosures.

Next, a scanning process which realizes the scanning operation and the drive restriction operation described above will be described with reference to FIG. 5. It is noted that the scanning process shown in FIG. 5 is started by the CPU 31 in response to receipt of the scan start instruction. It is noted that the scanner 100 may receive the scan start instruction through the operation panel 40, or from an external device through the network interface 37.

In the scanning process, the CPU 31 determines whether there are original documents 61 on the ADF 61 (S101) based on the output signal of the original document sensor 74. When it is determined that there are original documents on the ADF 61 (S101: YES), the CPU 31 executes the ADF scanning. In this case, the CPU 31 executes an ADF scanning process (S102) in which the ADF scanning is executed, and further, positioning of the scanning device 21 for a subsequent scanning is executed. The ADF scanning process will be described in detail later.

When it is determined that there are no original documents on the ADF 61 (S101: NO), the CPU 31 executes the FB scanning (S103). It is noted that the FB scanning is an example of a first scanning process set forth in the claims. In detail, the CPU 31 firstly drives the motor 68 to locate the scanning device 21 to the FB start position. Then, the CPU 31 causes the scanning device 21 to start scanning and drives the motor 69 to move the scanning device 21 rightward in FIG. 1 at a constant speed. When the CPU 31 determines that the scanning device 21 has reached a particular position, for example, an end of the original document, the CPU 31 makes the scanning device 21 stop scanning, and stops driving the motor 68. It is noted that the CPU 31 may determine the scan end position based on the scan settings instead of detecting the end of the original document.

Next, in S104, the CPU 31 causes the scanning device 21 to start moving leftward in FIG. 1 toward by setting the FB start position as a target stop position. Then, the CPU 31 determines whether the user selection input to scan the next original document in the continuous scanning mode is received (S105). As mentioned above, when the FB scanning is executed, the scanner 100 displays a screen enabling the user to input the user selection to execute scanning continuously or to end the scanning operation on the operation panel 40. When the CPU 31 determines that the user selection to continue is not received through the operation panel 40 (S105: NO), the CPU 31 keeps moving the scanning device 21 with maintaining the FB start position as the target stop position.

Then, the CPU 31 determines whether the selection input to end the scanning is input through the operation panel 40 (S106). When it is determined that the selection input to end the scanning is not received (S106: NO), the CPU 31 returns to S105 and keeps moving the scanning device 21 until the instruction to continue or end the scanning is received. That is, the CPU 31 keeps determining whether the instruction to continue or to end the scanning is made when the CPU 31 is moving the scanning device 21. It is noted that, when the scanning device 21 has reached the FB start position before the CPU 31 receives the instruction to continue or to end the scanning, the CPU 31 makes the scanning device 21 stop at the FB start position. Alternatively, the CPU 31 may determine that "end" of the scanning is selected if a particular time period has elapsed without receiving the instruction to continue or to end the scanning.

When it is determined that the instruction to end the scanning has been selected (S106: YES), the CPU 31 outputs the image data which has been stored as scanning has executed in accordance with the output format designated in the scan settings (S108). Further, the CPU 31 drives the motor 68 to move the scanning device 21 to the home position (S109), and finishes the scanning process. Unless the scanning operation is to be continued, it is likely that there is sufficient time until the next scanning operation is executed, and therefore, the scanning device 21 is moved to the home position. It is advantageous to locate the scanning device 21 at the home position, since, when the next scanning operation is started, compensation processes including the light amount adjustment can be executed quickly.

When the instruction of the continuous scanning is input through the operation panel 40 (S105: YES), the CPU 31 determines whether the motor 68 is in a high-temperature state (S111). Specifically, the CPU 31 determines whether the temperature of the motor 68 is higher than a first threshold temperature. It is noted that the first temperature is lower than the reference temperature mentioned above. It is also noted the first threshold temperature is an example of a first temperature set forth in the claims.

When it is determined that the motor 68 is in the high-temperature state (S111: YES), the CPU 31 determines whether there are original documents on the ADF 61 based on the output signal of the original document sensor 74. When it is determined that there are no original documents on the ADF (S112: NO), the CPU 31 determines whether the stop position of the scanning device 21 is changeable (S113).

In S104, the CPU 31 starts moving the scanning device 21 with the FB start position set as the target stop position. When the motor 68 has not reached a delimitation position for changing the stop position, and thereby the CPU 31 determines that the stop position of the scanning device 21 is changeable (S113: YES), the CPU 31 returns to S112 and determines whether there are original documents on the ADF 61. Until the CPU 31 determines that there are original documents on the ADF 61 or the scanning device 21 has already reached that delimitation position, the CPU 31 keeps moving the scanning device 21. According to the illustrative embodiment, the delimitation position is a position at which a control of the scanning device 21 to stop at the FB start position is to be started. Thus, if the scanning device 21 has not reached the delimitation position, the target position of the scanning device 21 can be changed from the FB start position to ADF start position or the home position, which is farther than the FB start position in the moving direction (i.e., leftward in FIG. 1) of the scanning device 21.

When it is determined that the scanning device 21 has reached the delimitation position (S113: NO), the CPU 31 causes the scanning device 21 to stop at the FB start position (S115), and terminates the scanning process. It is noted that, when the it is determined that there are no original documents on the ADF 61 when the scanner 100 receives the instruction to execute a subsequent scanning job to be continuously executed, the CPU 31 executes the FB scanning with moving the scanning device 21 from the FB start position at which the scanning device 21 was stopped in S115.

When it is determined that there are original documents on the ADF 61 before the scanning device 21 has reached the delimitation position (S112: YES), the CPU 31 changes the target stop position of the scanning device 21 to the ADF start position (S116), moves the scanning device 21 to the ADF start position, and terminates the scanning process. That is, in this case, the CPU 31 causes the scanning device 21 to stop at the ADF start position, but not the FB start position.

In the above case, when the scanner is operating in the continuous scanning mode and there are original documents on the ADF 61 after execution of the FB scanning, it is assumed that the next scanning is the ADF scanning. Therefore, according to the illustrative embodiment, when there are original documents on the ADF 61 after the FB scanning is executed in the continuous scanning mode, the CPU 31 causes the scanning device 21 to stop at the ADF start position. When the CPU 31 receives the instruction to start the next scanning job with the original documents being placed on the ADF 61, the next scanning job can be executed immediately since the scanning device 21 has already been located at the ADF start position. As above, according to the illustrative embodiment, in comparison with a case where the scanning device 21 is once returned to the FB start position after the FB scanning is executed and the scanning device 21 is moved when it is determined that there are original documents on the ADF 61, it is likely that a scanning job can be finished quickly. It is noted steps S112, S115 and S116 are examples of a positioning process after the first scanning process set forth in the claims.

When it is determined that the motor 68 is not in the high-temperature state (S111: NO), the CPU 31 changes the stop position of the scanning device 21 to the home position, and controls the motor 68 to move the scanning device 21 to the home position (S117). Further, the scanner 100 causes the scanning device 21 to scan the white plate 77 and executes compensation processes including the light amount adjustment process (S118), and terminates the scanning process.

It is noted that, by returning the scanning device 21 to the home position after execution of the FB scanning, it becomes possible to execute the compensation processes including the light amount adjustment process, which enables a high definition image scanning thereafter. However, if the scanning device 21 is returned to the home position every time a scanning job is finished, the driving amount of the motor 68 increases and the temperature of the motor 68 may rise quickly. As mentioned above, when the temperature of the motor 68 rises too much, driving of the motor 68 is restricted and the scanning is interrupted, which may be inconvenient to the user. According to the illustrative embodiment, when the driving amount of the motor 68 is relatively large, the CPU 31 moves the motor 68 not to the home position, but to the start position of the next scanning (i.e., the FB start position or ADF start position). Therefore, according to the illustrative embodiment, disadvantage for the user mentioned above can be lightened.

According to the above-described embodiment, when the motor is not in the high-temperature state, the scanning device 21 is moved to the home position and the light amount adjustment is executed every time when the scanning job is executed. It is noted, however, the light amount adjustment needs not be executed every time when the scanning job is executed. Accordingly, such a configuration may be modified such that, for example, the light amount adjustment may be executed every time when a particular number or more of original documents are scanned.

Figure 6:
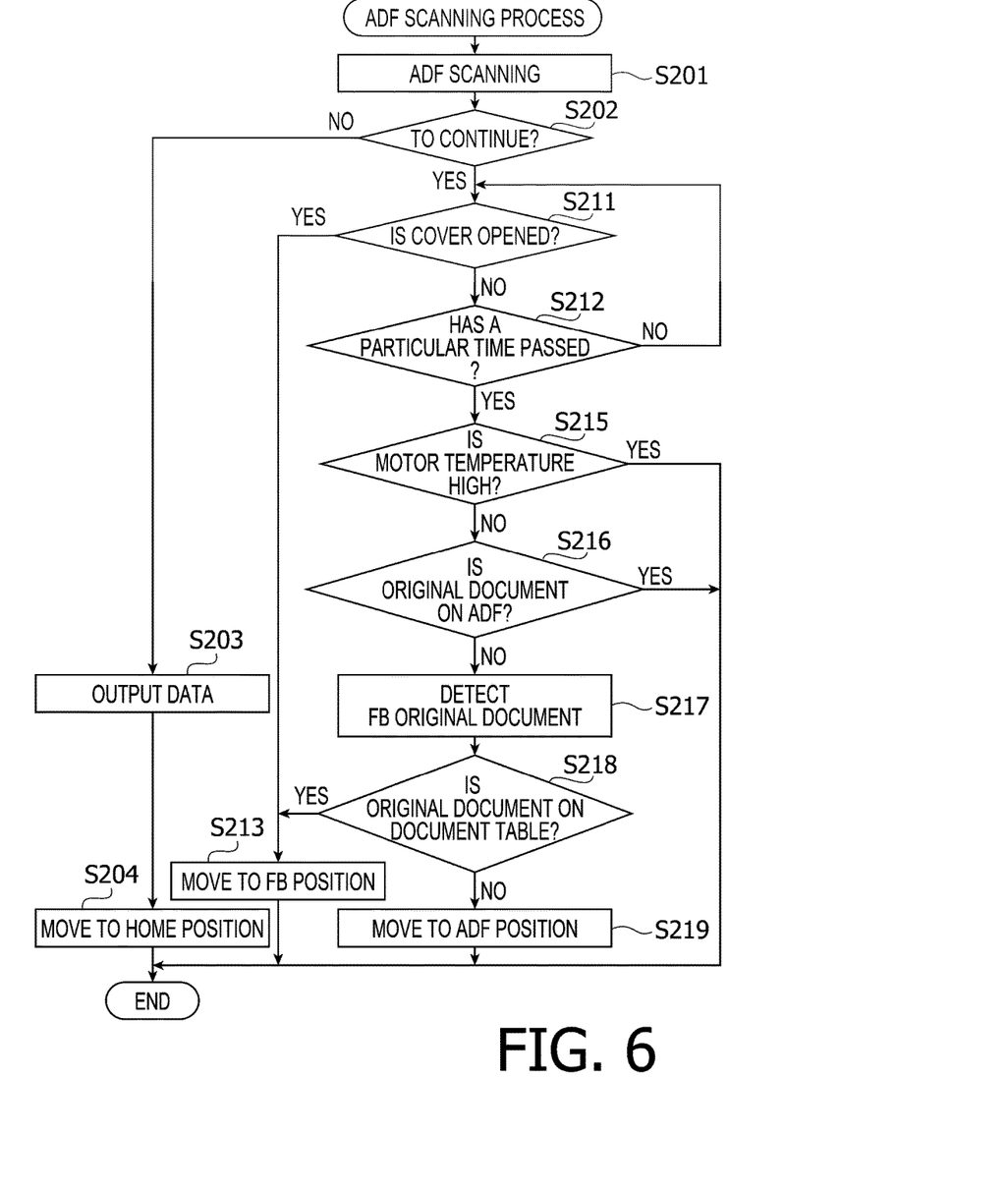
FIG. 6 is a flowchart illustrating an ADF scanning process according to the illustrative embodiment of the disclosures.

The ADF scanning process will be described with reference to FIG. 6. The ADF scanning process is executed when a scanning instruction is received and it is determined that there are original documents on the ADF 61. Specifically, the ADF scanning process is executed when a decision at S101 (FIG. 5) is YES.

When the ADF scanning process is started, the CPU 31 firstly executes the ADF scanning (S201). That is, the CPU 31 locates the scanning device 21 at the ADF start position, feeds the original documents placed on the original document tray 62 one by one using the ADF 61, and causes the scanning device 21 to scan images on the respective original documents which are fed one by one. It is noted that a step S201 is an example of a second scanning process set forth in the claims. It is noted that the scanning device 21 is located (i.e., stays) at the ADF start position when the ADF scanning is finished.

Next, the CPU 31 determines whether the continuous scanning mode is effected in the scan settings (S202). When it is determined that the continuous scanning mode is not set (S202: NO), the CPU 31 outputs the image data, which has been scanned and stored in accordance with the output format designated by the scan setting (S203). Further, the CPU 31 drives the motor 68 to move the scanning device 21 to the home position (S204), and terminates the ADF scanning process. After the ADF scanning process is finished, control is returned to the scanning process, and the CPU 31 terminates the scanning process.

When the continuous scanning mode is effected (S202: YES), the CPU 31 determines whether the flatbed cover 69 is opened and then closed based on the output signal of the cover sensor 75 (S211). When it is not determined that the flatbed cover 69 is opened and closed (S211: NO), the CPU 31 determines whether a particular time period has elapsed (S212). The particular time period is a time period assumed to be necessary for the user to open the flatbed cover 69, place the original document on the contact glass 16 and close the flatbed cover 69. For example, the particular time period may be about 30 seconds.

When it is determined that the particular time period has not elapsed (S212: NO), the CPU 31 returns to S211 and determines whether the flatbed cover 69 is opened and closed. When it is determined that the flatbed cover 69 is opened and closed before the particular time period has elapsed (S211: YES), the CPU 31 moves the scanning device 21 to the FB start position (S213) and terminates the ADF scanning process.

When the flatbed cover 69 is opened and then closed within the particular time period after the ADF scanning is finished, it is very likely that an original document is placed on the contact glass 16. That is, in such a case, it is assumed that the next scanning job is the FB scanning. According to the illustrative embodiment, since the scanner 100 locates the scanning device 21 to the FB start position before the instruction of the next scanning, the next scanning can be executed quickly if it is the FB scanning, and thus the scanning job can be completed quickly.

When it is determined that the flatbed cover 69 is not opened/closed and the particular time period has elapsed (S212: YES), the CPU 31 determines whether the motor 68 is in the high-temperature state (S215). Specifically, the CPU 31 determines whether the temperature of the motor 68 is higher than a second threshold temperature. The second threshold temperature is lower than the reference temperature. It is noted that the second threshold temperature may be the same as the first threshold temperature or different therefrom. It is noted that the second threshold temperature is an example of a second temperature set forth in the claims.

When it is determined that the temperature of the motor 68 is not high (S215: NO), that is, when it is determined that the temperature of the motor 68 is equal to or less than the second threshold temperature, the CPU 31 determines whether there are original documents on the ADF 61 based on the output signal of the original document sensor 74 (S216). When it is determined that there are no original documents on the ADF 61 (S216: NO), the CPU 31 executes an operation to detects the original document on the contact glass 16 (S217).

In S217, the scanner 100 moves the scanning device 21 to the FB start position, and then moves the scanning device 21 rightward in FIG. 1 by a particular distance with making the scanning device 21 execute a scanning operation. That is, the scanner 100 causes the scanning device 21 to scan a particular range in an auxiliary scanning direction, and attempts to detect the original documents on the contact glass 16 based on the image data obtained as the scanned result.

The scanner determines that the original document is present on the contact glass 16 when, for example, an area exhibiting low brightness which can be regarded as an edge portion of the original document, or an area having a brightness value which is different from the brightness value of a background member of the flatbed cover 69. It is noted that the particular area scanned in this process is sufficient if presence/absence of the original document can be determined based on the image data, and according to the illustrative embodiment, the length of the area in the auxiliary scanning direction may be within a range from 5 mm to 20 mm.

Then, the CPU 31 determines, in S218, whether an original document is placed on the contact glass 16 based on the detection result in S217. It is noted that step S218 is an example of an original document presence/absence determination process set forth in the claims. When it is determined that there is an original document on the contact glass 16 (S218: YES), the CPU 31 moves the scanning device 21 to the FB start position (S213), and terminates the ADF scanning process.

When there is an original document on the contact glass 16, it is likely that the next scanning instruction addresses the FB scanning. Accordingly, when it is determined that there is an original document on the contact glass 16, the scanner 100 locates the scanning device 21 at the FB start position. Therefore, if the next scanning is the FB scanning, the scanning can be started quickly and the scanning job can be completed quickly.

When it is determined that there is not an original document on the contact glass 16 (S218: NO), the CPU 31 locates the scanning device 21 at the ADF start position (S219), and terminates the ADF scanning process. It is noted that if there is no original document on the contact glass 16, it is likely that the next scanning instruction is of the ADF scanning. Therefore, by locating the scanning device 21 at the ADF start position, the scanning operation can be started quickly if the next scanning is the ADF scanning, and accordingly, the scanning job can be completed quickly. It is noted that steps S218, S213 and S219 are example of a positioning process after the second scanning process set forth in the claims.

When the motor 68 is in the high-temperature state, if the scanning device 21 is further moved in S217 to execute an operation to detect the original document, there is a possibility that the temperature of the motor 68 rises further. Therefore, when it is determined that the motor 68 is in the high-temperature state (S215: YES), the CPU 31 does not move the scanning device 21 (i.e., the scanning device 21 stays at the ADF start position), and the ADF scanning process is terminated.

If the motor 68 is driven in order to detect presence/absence of the original document on the contact glass 16, the temperature of the motor 68 is further raised and may reach the reference temperature. Therefore, it is advantageous not to execute the operation to detect presence/absence of the original document on the contact glass 16 if the motor 68 is in the high-temperature state, and remains the scanning device 21 staying at the ADF start position.

Further, when it is determined that there are original documents on the ADF 61 (S216: YES), the CPU 31 terminates the ADF scanning process without executing any further steps. It is very likely that that the next scanning instruction is of the ADF scanning when there are original documents on the ADF 61. Therefore, when it is determined that there are original documents on the ADF 61, the CPU 31 does not detect presence/absence of the original document on the contact glass 16, and may remain the scanning device 21 staying at the ADF start position unless the next scanning instruction is received.

As described in detail above, the scanner 100 according to the illustrative embodiment is capable of executing the FB scanning and the ADF scanning, and can operate in the continuous scanning mode. When the FB scanning is executed, and the operation mode is the continuous scanning mode, the scanner 100 locates the scanning device 21 at the ADF start position if it is detected that there are original documents on the ADF 61 after the scanning operation in the FB scanning is finished and before the scanning device 21 reaches the FB start position. If the scanner 100 operates in the continuous scanning mode and the original documents are placed on the ADF 61 after the previous scanning (i.e., the FB scanning) is started, it is likely that the ADF scanning is executed after the currently executed FB scanning.

Accordingly, by positioning the scanning device 21 at the ADF start position, the next scanning (i.e., the ADF scanning) can be started immediately, and accordingly, the scanning job can be finished quickly.

It should be noted that the above-described embodiment is only an illustrative embodiment, and is not intended to limit the aspects of the disclosures. Rather, the illustrative embodiment can be modified in various ways without departing from the aspects of the disclosures. For example, the aspects of the disclosures can be applied to any devices having an image scanning function such as copiers, multi-function peripherals, facsimile machines and the like.

It is noted that the while plate 77 needs not be limited to a plate having white color, but colors other than white such as gray. Further, the shape of the white plate needs not be limited to the shape of a plate as far as a necessary function is provided. That is, a member which can be scanned by the scanning device 21 when located at the home position, and a reference value regarding scanning thickness can be set by scanning the member, any member can be used instead of the white plate 77 of the illustrative embodiment described above.

When the FB scanning is to be executed, the scanner 100 may receive the instruction of the continuous scanning included in the scan setting before scanning is executed, and the scanner 100 may operate based on the received scan settings. For example, when the scan settings include an instruction not to execute the continuous scanning, the scanner 100 may output the image data immediately upon completion of scanning without asking the user after the FB scanning is completed.

It is noted that the scanner 100 may use a motor 68A to drive conveying members of the ADF 61 and a motor 28B to drive the carriage 51 of the scanning device 21, instead of using one motor 68 as in the above-described illustrative embodiment. In such a case, a temperature of each of the motors 68A and 68B is obtained, and restrict movement of respective motors 68A and 68B based on the obtained temperatures.

It is noted that the determination whether there is an original document on the contact glass 16 needs not be limited to one based on the scanning operation. For example, a dedicated document sensor, which outputs different signals depending on presence/absence of the original document on the contact glass 16, may be provided, and whether the original document is present/absent on the contact glass 16 may be determined based on the output of the dedicated sensor.

According to the illustrative embodiment, the controller 30 functions to restrict operation of the motor 68. Instead of using the controller 30, a dedicated circuit to control the operation of the motor 68 may be provided, and the operation of the motor 68 may be executed by the dedicated circuit. In such a case, the dedicated circuit may be included in an example of the controller set forth in the claims.

Restriction of operation of the motor 68 based on the temperature of the motor 68 may not be executed. For example, the scanning process may be modified such that S111 is omitted, and S112 and S113 are executed regardless of the temperature of the motor 68.

Further, the light amount adjustment after the FB scanning may not be executed. Furthermore, detection of presence/absence of the original document on the contact glass 16 after the ADF scanning may not be executed. For example, after execution of the ADF scanning, the scanning device 21 may be stayed at the ADF start position until the next scanning instruction is received.

Processes described in the above-described illustrative embodiment may be executed by a single CPU, multiple CPU's, hardware such as an ASIC (application specific integrated circuit), or any combination thereof. Further, processes disclosed in the illustrative embodiment may be realized by a non-transitory computer-readable medium containing programs to execute the processes, methods of executing the processes, or the like.

What is claimed is:

1. A scanner, comprising:
an original document table;
an automatic document feeder configured to automatically feed original documents;
an original document sensor configured to output different signals depending on whether the original document is located at a particular position in a conveying path of the automatic document feeder;
a scanning device; and
a controller,
wherein the controller is configured to execute:
a scan setting process in which it is determined to effect a continuous scanning mode in which multiple scanning jobs are continuously executed under both of a first scanning process and a second scanning process executed by the controller, multiple pieces of scanned data obtained by the multiple scanning jobs, respectively, being accumulated to generate one file,
the first scanning process comprising moving the scanning device along the original document table, starting from a first position, and scanning an image on the original document placed on the original document table to obtain first scanned data,
the second scanning process comprising causing the automatic document feeder to feed the original documents one by one, locating the scanning device at a second position, and causing the scanning device to scan the image on the original document fed along the conveying path to obtain second scanned data,
wherein, subsequent a first execution of the first scanning process, a first positioning process is executed in which the controller:
causes an initiation of movement of the scanning device towards the first position, and
when the original document sensor outputs a signal indicating the presence of the original document, locates the scanning device to a second position as set-up for execution of the second scanning process and executes the second scanning process, wherein the second scanned data obtained from execution of the second scanning process is accumulated with the first scanned data, and
when the original document sensor does not output a signal indicating the presence of the original document, locates the scanning device to the first position as set-up for a second execution of the first scanning process and performs the second execution of the first scanning process, wherein the first scanned data obtained from the second execution of the first scanning process is accumulated with the first scanned data obtained from the first execution of the first scanning process.

2. The scanner according to claim 1,
further comprising a white level reference plate,
wherein the controller is configured to move the scanning device to a third position at which the scanning device faces the white level reference plate when:

scanning of the original document in one of the first scanning process and the second scanning process has been completed; and the continuous scanning mode is not effected.

3. The scanner according to claim 1, further comprising:

a white level reference plate; and a driving motor configured to move at least the scanning device, wherein the controller is configured to execute:

a restriction process in which the controller restricts movement of the driving motor when the temperature of the driving motor exceeds a reference temperature; and when the first scanning process has been executed and the continuous scanning mode is effected:

move the scanning device to by executing the first positioning process after the first scanning process on condition that the temperature of the driving motor is higher than a first temperature which is lower than the reference temperature; and move the scanning device to a third position at which the scanning device faces the white level reference plate after scanning of an image on the original document in the first scanning process has been completed on condition that the temperature of the driving motor is not higher than the first temperature.

4. The scanner according to claim 1, wherein the controller is further configured to execute an original document presence/absence determination process in which the controller determines whether the original document is present or absent on the original document table; and wherein, when the controller executes the second scanning process and the continuous scanning mode is effected, the controller executes:

the original document presence/absence determination process on condition that a particular time has elapsed and the original document sensor does not output the signal indicative of presence of the original document after completion of scanning of the image on the original document in the second scanning process; and a second positioning process in which the controller:

move the scanning device to the first position when it is determined in the original document presence/absence determination process that the original document is present; and move the scanning device to the second position when it is not determined in the original document presence/absence determination process that the original document is present.

5. The scanner according to claim 4, further comprising:

a cover configured to cover the original document table; and a cover sensor configured to output different signals depending on whether the caver part is in a closed state or an open state, wherein, when the second scanning process is executed and the continuous scanning mode is effected, the controller is further configured:

not to execute the original document presence/absence determination process; and to determine that the original document is present and move the scanning device to the first position, on condition that the controller detects open and close of the cover part based on the signals output by the cover sensor after scanning of the image on the original document by the second scanning process is completed and the particular time has elapsed.

6. The scanner according to claim 1, further comprising a driving motor configured to move at least the scanning device, wherein the controller is configured to execute a restriction process in which the controller restricts driving of the driving motor when it is determined that the temperature of the driving motor exceeds a reference temperature, wherein the controller executes a partial scanning to scan a partial area on the original document table by moving the scanning device by a particular amount, and determines whether the original document is present or absent on the original document scanning table based on a result of the partial scanning, and wherein, in the second positioning process after the second scanning process, when the second scanning process is executed and the continuous scanning mode is effected, the controller is configured to execute the original document presence/absence determination process on condition that a particular time has elapsed and the original document sensor has not outputted a signal indicative of presence of the original document after scanning of the image on the original document in the second scanning process has completed, and that the temperature of the driving motor is lower than a second temperature which is lower than the reference temperature, and wherein, in the second positioning process after the second scanning process, the controller moves the scanning device to:

the first position when it is determined in the original document presence/absence determination process that the original document is present; and the second position when it is determined in the original document presence/absence determination process that the original document is absent.

7. The scanner according to claim 3, wherein the driving motor comprises:

a first motor serving as a drive source to cause the scanning device to move in the first scanning process; and a second motor serving as a drive source to cause the original document feeding device to feed the original documents in the second scanning process, wherein the controller is configured to:

obtain a temperature of the first motor and a temperature of the second motor respectively, and when it is determined that the temperature of at least one of the first motor and the second motor exceeds a reference temperature, restricts driving of the at least one of the first motor and the second motor of which temperature is determined to exceed the reference temperature.

8. The scanner according to claim 3, wherein the driving motor has a single motor serving as a driving source when the scanning device is moved in the first scanning process and when the original document feeding device feeds the original documents in the second scanning process.

9. A non-transitory computer-readable medium storing instructions for a scanner having an original document table, an automatic document feeder configured to automatically feed original documents, an original document sensor configured to output different signals depending on whether the original document is located at a particular position in a conveying path of the automatic document feeder, a scanning device, and a controller,     wherein the instructions, when executed by the controller, cause the scanner to execute:

a scan setting process in which it is determined to effect a continuous scanning mode in which multiple scanning jobs are continuously executed under both of a first scanning process and a second scanning process executed by the controller, multiple pieces of scanned data obtained by the multiple scanning jobs, respectively, being accumulated to generate one file,         the first scanning process comprising moving the scanning device along the original document table, starting from a first position, and scanning an image of the original document placed on the original document table to obtain first scanned data,         the second scanning process comprising causing the automatic document feeder to feed the original documents one by one, locating the scanning device at a second position, and causing the scanning device to scan the image on the original document fed along the conveying path to obtain second scanned data,     wherein, subsequent a first execution of the first scanning process, a first positioning process is executed in which the controller:

causes an initiation of movement of the scanning device towards the first position, and         when the original document sensor outputs a signal indicating the presence of the original document, locates the scanning device to a second position as set-up for execution of the second scanning process and executes the second scanning process, wherein the second scanned data obtained from execution of the second scanning process is accumulated with the first scanned data, and         when the original document sensor does not output a signal indicating the presence of the original document, locates the scanning device to the first position as set-up for a second execution of the first scanning process and performs the second execution of the first scanning process, wherein the first scanned data obtained from the second execution of the first scanning process is accumulated with the first scanned data obtained from the first execution of the first scanning process.

* * * * *